(12) United States Patent
Cui (10) Patent No.: US 8,904,677 B2
(45) Date of Patent: Dec. 9, 2014

(54) LOCKING PIN ASSEMBLY

(71) Applicant: Kan Cui, Sammamish, WA (US)

(72) Inventor: Kan Cui, Sammamish, WA (US)

( * ) Notice: Subject to any disclaimer, the term of this patent is extended or adjusted under 35 U.S.C. 154(b) by 38 days.

(21) Appl. No.: 13/938,155

(22) Filed: Jul. 9, 2013

(65) Prior Publication Data

US 2014/0013635 A1 Jan. 16, 2014

Related U.S. Application Data

(60) Provisional application No. 61/670,977, filed on Jul. 12, 2012.

(51) Int. Cl.
*E02F 9/28* (2006.01)
*F16B 3/00* (2006.01)

(52) U.S. Cl.
CPC ............. *E02F 9/2833* (2013.01); *E02F 9/2841* (2013.01); *F16B 3/00* (2013.01)
USPC .......................................................... 37/456

(58) Field of Classification Search
USPC ............ 37/446, 450–460; 403/318, 319, 294, 403/355, 153, 154, 374.1–374.4, 379.2, 403/379.4; 299/102, 103, 106, 108
See application file for complete search history.

(56) References Cited

U.S. PATENT DOCUMENTS

| | | | | |
|---|---|---|---|---|
| 5,992,063 | A * | 11/1999 | Mack | ............................. 37/450 |
| 6,708,431 | B2 | 3/2004 | Robinson et al. | |
| 7,603,799 | B2 * | 10/2009 | Campomanes | ................. 37/456 |
| 7,690,137 | B2 * | 4/2010 | Pasqualini | ....................... 37/455 |
| 8,261,472 | B2 * | 9/2012 | Ruvang | .......................... 37/456 |
| 8,720,088 | B2 * | 5/2014 | Knight | ............................ 37/456 |
| 2004/0016153 | A1 | 1/2004 | Pippins | |
| 2004/0216336 | A1 | 11/2004 | Briscoe | |
| 2005/0028407 | A1 | 2/2005 | Ruvang et al. | |
| 2007/0137071 | A1 | 6/2007 | McClanahan et al. | |
| 2007/0137072 | A1 | 6/2007 | Briscoe | |
| 2007/0261278 | A1 | 11/2007 | Campomanes | |
| 2010/0162595 | A1 | 7/2010 | Leslie et al. | |
| 2012/0055052 | A1 | 3/2012 | Campomanes et al. | |

* cited by examiner

*Primary Examiner* — Robert Pezzuto
(74) *Attorney, Agent, or Firm* — Richard C Litman (57) ABSTRACT

The locking pin assembly includes an elongate pin housing and a pin mechanism insertably mounted into a bore in the pin housing. The pin mechanism includes at least one rotator section integral with a pin shaft. A rotation-locking member is integrally attached to the bottom of the pin shaft, the locking member having a non-circular shape. An elongate post having a rotation-locking collar attached to one end of the post is slidable in a keyhole extending through the pin. A non-circular recess is formed in the rotation-locking collar, which selectively receives the locking member therein. A spring is disposed behind the rotation-locking collar. The spring normally biases the locking collar into engagement with the locking member. A key is provided to axially push the post to selectively disengage the locking member for selective rotation of the rotator section between locked and unlocked positions.

20 Claims, 11 Drawing Sheets

LOCKING PIN ASSEMBLY

CROSS-REFERENCE TO RELATED APPLICATION

This application claims the benefit of U.S. Provisional Patent Application Ser. No. 61/670,977, filed Jul. 12, 2012.

FIELD OF THE INVENTION

The present invention relates to locking devices, and particularly to a locking pin assembly for selectively locking mating parts in general, and in particular, for replacing excavating teeth with ease and without the use of impact tools.

DESCRIPTION OF THE RELATED ART

Many interlocking structures require some sort of locking mechanism connecting the parts together. Some examples include extendable legs on load bearing structures, articulating beams and the means for setting angular positions of the beams, parts for connecting to a stand and the like. One area in which locking mechanisms are used is for securing replaceable or interchangeable elements, such as the teeth on excavators. Excavators and excavating machines experience a high degree of wear in the working environment. The teeth on these excavators must frequently be replaced in order to function properly and maintain predefined working schedules.

Conventional excavating machines include interchangeable and replaceable teeth, commonly referred to as "buckets," mounted on a mounting base. Traditionally, these teeth are locked in place by a pin, which is impacted into the corresponding slot between the mounting base and the replaceable teeth. To unlock, the same impact tool is used to pound the pin back out. This type of system can be a dangerous manner of installing the teeth, which can lead to potential accidental injuries.

Several tool-less designs have been proposed, an example of which is described in Robinson et al., U.S. Pat. No. 6,708,431, which is incorporated in its entirety by reference. In this reference, Robinson et al. teaches a pin assembly inserted through the bucket and the base. The tooth is locked or unlocked by selective rotation of the pin. While this is a functional tool-less design, the pin assembly is comparatively complicated. The interior of the pin assembly includes various cam projections and corresponding grooves, which can be rather time-consuming and complicated to manufacture. Moreover, one must insure the projections are properly engaged to insure that locking and unlocking can be performed without issue.

In light of the above, it would be a benefit in the art of locking devices to provide a locking pin mechanism that is easy in construction and installation with minimal physical effort. Thus, a locking pin assembly for replaceable excavating teeth and/or mating parts solving the aforementioned problems is desired.

SUMMARY OF THE INVENTION

The locking pin assembly includes an elongate pin housing and a pin mechanism insertably mounted through a bore in the pin housing. The pin mechanism includes at least one rotator section slidably attached to a pin shaft. A rotation-locking member is integrally attached to the bottom of the rotator section, the locking member having a non-circular shape. The pin shaft includes an elongate post and a rotation-locking collar attached to one end of the post. A non-circular recess is formed in the rotation-locking collar, which selectively receives the locking member therein. A spring is disposed behind the rotation-locking collar. The spring normally biases the locking collar into engagement with the locking member. A key is provided to axially push the post to selectively disengage the locking member for selective rotation of the rotator section between locked and unlocked positions. The locking pin assemblies include alternative single-side and dual-side access embodiments.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The locking pin assembly, a first embodiment of which is generally referred to by the reference number 10 in the drawings, provides safe and easy locking and unlocking features that requires minimal physical effort. The pin assembly 10, shown in FIGS. 1-4, includes a pin housing 20 (also referred to as a pin body or cartridge) and a pin mechanism or component 30 selectively inserted into the pin housing 20. The pin housing 20 is an elongate, substantially hollow cylindrical housing having a partially squared section 24 attached to the cylinder at one end. This partially squared section 24 results in a U-shaped or horseshoe shaped periphery at one end of the housing 20. The pin housing 20 is configured for insertion into a correspondingly shaped bore PH formed in the tooth base B. The pin housing 20 protects the pin mechanism 30 and prevents the housing 20 from rotating relative to the tooth base B. In order to prevent such rotation, it is preferable that the bore PH and the pin housing 20 have matching shapes or outlines, e.g., U-shape or horseshoe-shape for this embodiment. In the exemplary embodiment shown in FIGS. 1-4, the locking pin assembly 10 can be referred to as a single-side access locking pin assembly because the operation of the locking pin assembly 10 can only be accessed from one side of the pin housing 20 when assembled. The pin housing 20 is preferably constructed from high-strength steel. Other materials capable of withstanding the rigors of excavation work can also be used. Alternatively, different materials with high durability can be used, depending on the specific stresses experienced by the locking pin assembly 10, from lightweight, low-load bearing applications to higher stress applications. The pin housing 20 includes a substantially circular blind bore that extends about midway through the length of the pin housing 20. The bore accommodates selective insertion of the pin mechanism 30, and is preferably centered in the cylindrical portion of the end of the housing having the partially squared section 24 attached thereto.

Figure 4:
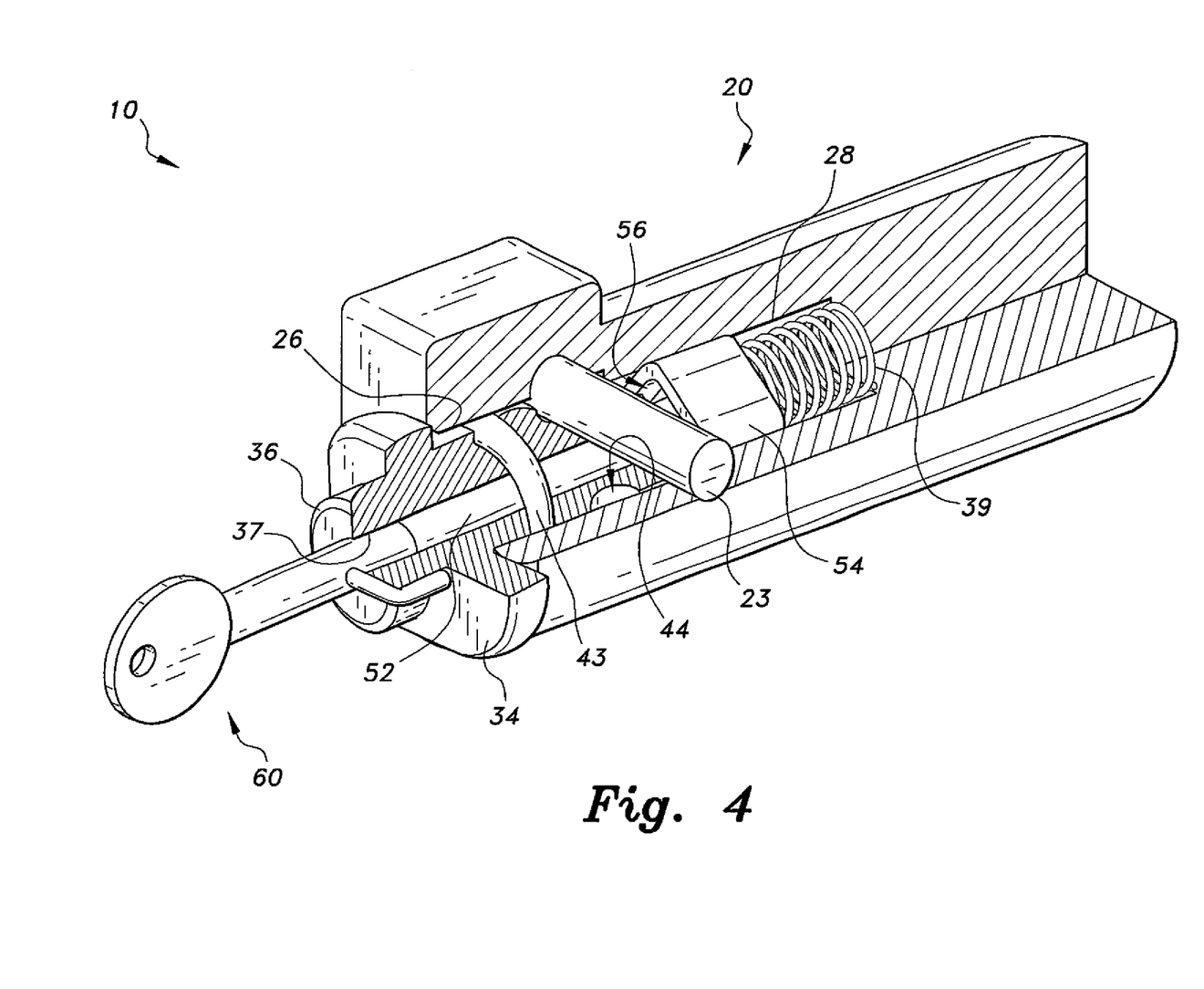
FIG. 4 is a perspective view of the pin of FIG. 3, shown with the key inserted and with the housing partially broken away and in section to show details thereof.

As best shown in FIG. 4, the blind bore is a stepped bore having a first section 26 and a second section 28. The first section 26 is an elongate cylindrical bore with a given diameter. The second section 28 is an elongate non-cylindrical bore of reduced dimensions in coaxial communication with the first section 26 and extends to the end of the blind bore. In this embodiment, the second section 28 is substantially square in cross section in order to accommodate a correspondingly shaped rotation-locking collar 54 of the pin mechanism 30. It is to be noted that the second section 28 can be constructed with any other geometric shape, so long as the shape can accommodate the shape of the rotation-locking collar 54 and related functions, which will be further detailed below.

Figure 3:
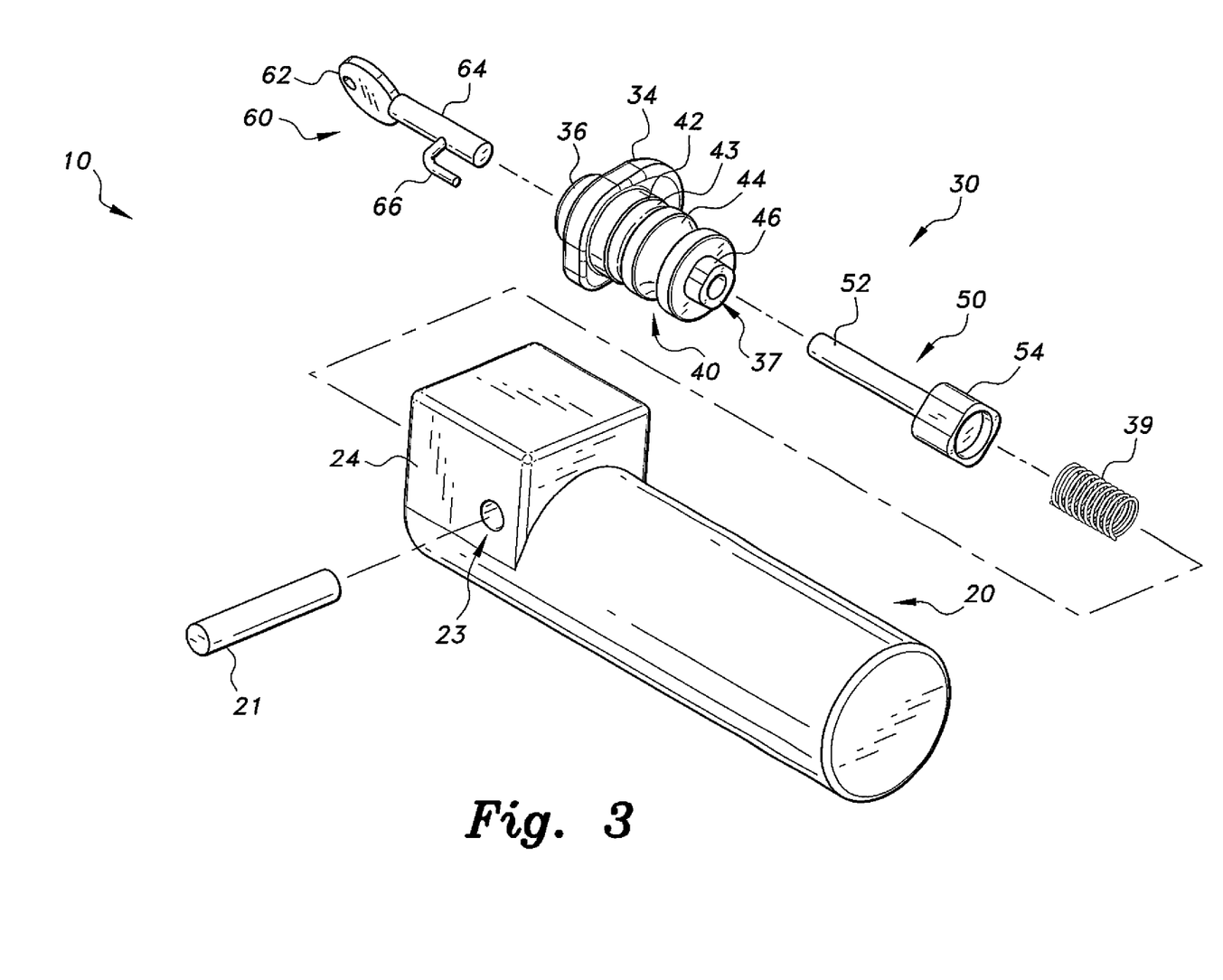
FIG. 3 is an exploded perspective view of the locking pin assembly of FIG. 2, shown with the key.

The pin mechanism 30 includes an elongate, substantially cylindrical body having a rotator section and an elongate shaft section 40. The rotator section includes a teardrop- or U-shaped cam knob or tang 34 and a circular turning boss or head 36 on top of the cam knob 34. The cam knob 34 is configured to be rotated into locking and unlocking positions in a similar manner as described in Robinson et al. The boss 36 includes a keyhole or key-bore 37 that extends through both rotator and shaft sections 34, 40.

The shaft section 40 is integral with and disposed below the rotator section 32 so that any rotation of the rotator section 32 also rotates the shaft section 40. The shaft section 40 includes a first annular groove 42 and a second annular groove 44. The first annular groove 42 accommodates a resilient O-ring 43 for preventing ingress of dirt and other debris into the interior of the pin housing 20. The second annular groove 44 locks the pin assembly 30 inside the pin housing 20 when assembled and permits selective rotation of the pin assembly 30 with respect to the pin housing 20. As best shown in FIG. 3, the locking pin assembly 10 includes a locking dowel 21 inserted through a through-bore 23 extending transversely through the squared section 24. Once inserted, a portion of the locking dowel 21 extends into the second annular groove 44, which prevents axial movement of the shaft section 40 but allows the shaft section 40 to rotate inside the bore 22. The shaft section 40 also includes a non-circular, projecting locking stub 46 integral with and fixed at the bottom of the shaft section 40. The locking stub 46 locks the pin mechanism 30 at various rotated positions in a manner that will be further described below. In this embodiment, the locking stub 46 is substantially square in cross section, and the keyhole 37 extends through the locking stub 46.

In order to facilitate locking or fixing the pin mechanism 30 at various rotated positions, the pin mechanism 30 includes a rotation-locking shaft 50 configured to reciprocate and rotate within the keyhole 37. The rotation-locking shaft 50 includes an elongate post 52 for slidable mounting inside the keyhole 37. A rotation-locking collar 54 is attached to one end of the post 52. The rotation-locking collar 54 includes a shaped recess 56 that surrounds the post 52, and the shape and dimensions thereof matches the shape and dimensions of the rotation-locking stub 46. This construction forms a selective mating pair for the rotation-locking stub 46 and the rotation-locking collar 54. In this embodiment, the shaped recess 56 is substantially square and dimensioned so that the locking stub 46 can be received therein with minimal effort. When assembled, the rotation-locking collar 54 is slidably received inside the second section 28 of the blind bore in the housing 20, which, due to the non-circular shape, prevents the rotation-locking shaft 50 from rotating within the second section 28. In other words, the operational movement of the rotation-locking shaft 50 is limited to reciprocal movement inside the pin housing 20. The pin assembly 20 also includes a compression spring 39 disposed between the closed, bottom end of the second section 28 of the bore and the rear of the rotation-locking collar 54. The spring 39 normally biases the rotation-locking shaft 50 against the shaft section 40 so that the rotation-locking stub 46 is continuously engaged with the rotation-locking collar 54. This locks the relative, rotated position of the cam knob 34. In this embodiment, the rotated positions are at 90° intervals with respect to the axis defined by the keyhole 37 and the post 52.

In order to disengage the locking stub 46 from the locking collar 54, the pin mechanism 30 is provided with a key 60. The key 60 includes a head 62 for manual manipulation, an elongate key shaft 64 extending from the head 62, and a key guide 66 extending from a lower portion of the key shaft 64. The key shaft 64 is configured to be selectively inserted into the keyhole 37 and preferably has substantially the same cross-sectional shape and dimensions as that of the post 52. It is to be understood that the shape and dimensions of the key shaft 64 can be varied, so long as the key shaft 64 can be inserted a desired distance into the keyhole 37. In this embodiment, the key guide 66 is configured as an L-shaped bracket for straddling the turning boss 36 between the keyhole 37 and the outer rim of the turning boss 36. Moreover, the key guide 66 is disposed at a predefined distance along the key shaft 64 in order to serve as a stop or abutment that defines the extent of insertion for the key 60. The extent of insertion should be at least enough to insure complete disengagement of the rotation-locking collar 54 from the rotation-locking stub 46. In addition, the key guide 66 can also function as a wrench-type tool when the key guide 66 straddles the turning boss 36, since the key guide 66 braces the key 60 thereon. This is especially effective when used in conjunction with a non-circular turning boss.

Figure 1:
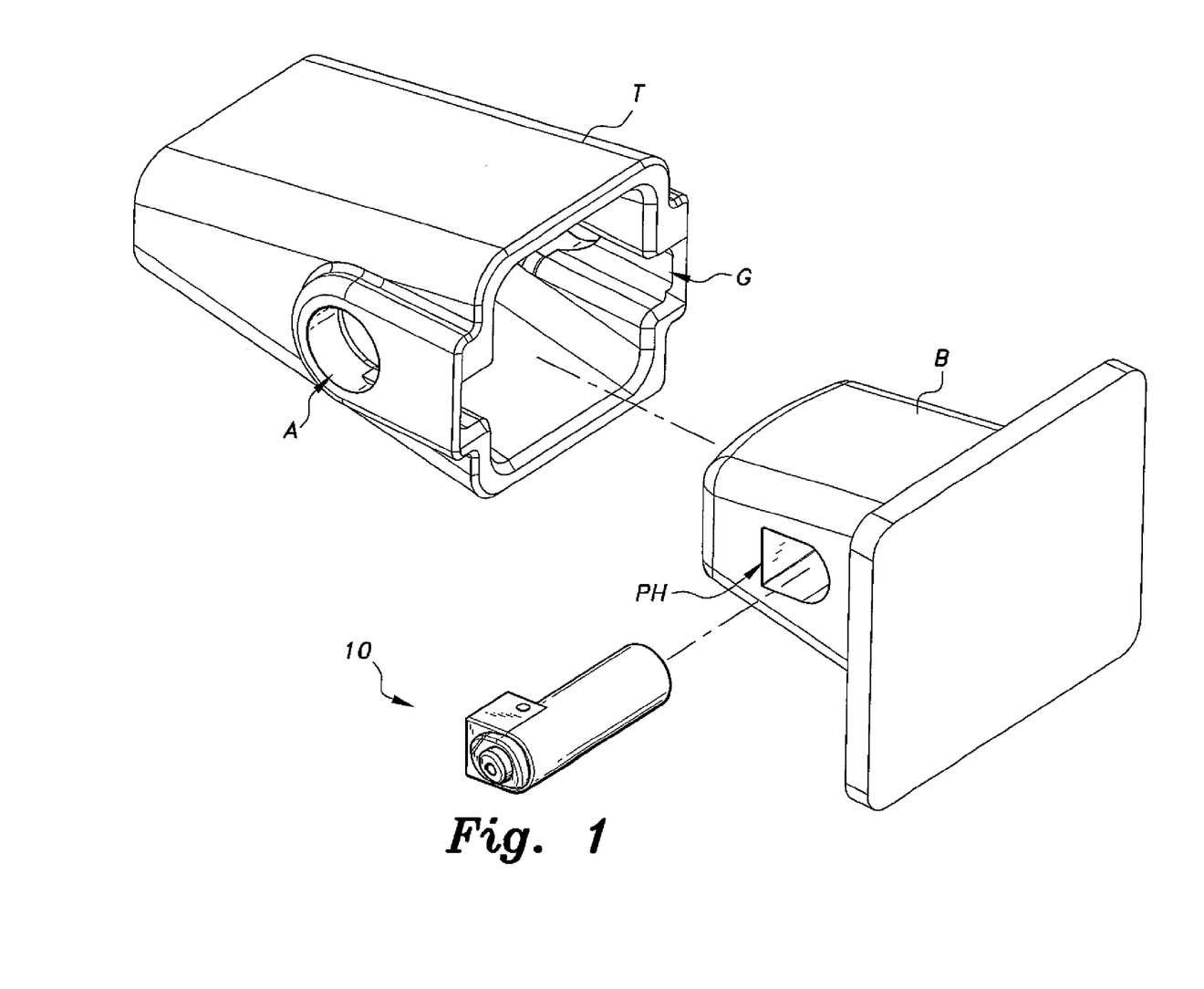
FIG. 1 is an environmental, perspective view of an excavator tooth having a locking pin assembly according to the present invention.
Figure 2:
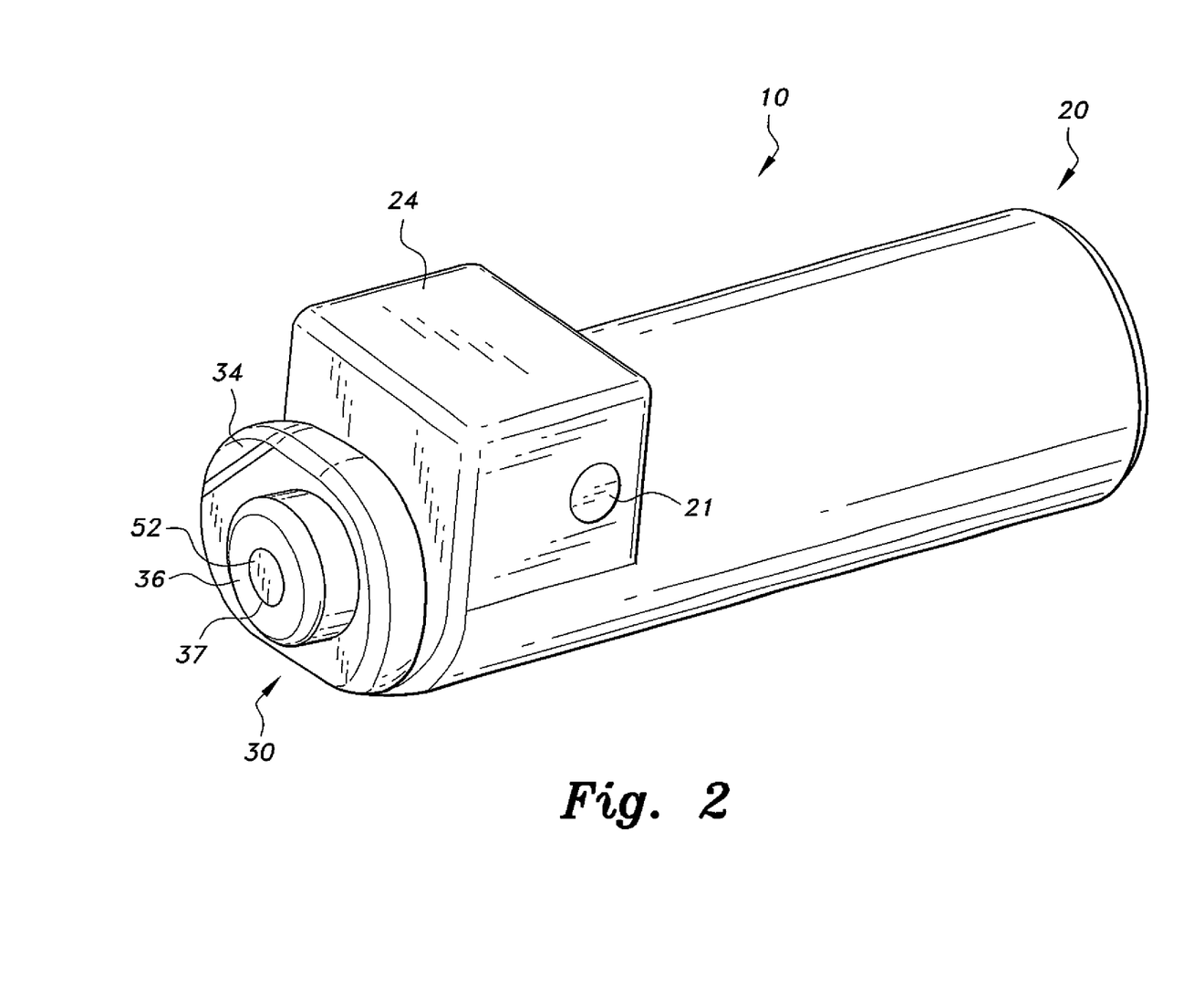
FIG. 2 is a perspective view of the locking pin assembly of FIG. 1.

In operation, the pin assembly 10 is assembled in the manner described above and inserted into the bore PH on the base B. The replaceable tooth T slides over the base B and includes interior grooves G, providing clearance for the rotator section. When the replaceable tooth T is securely placed, the key 60 is inserted through the access hole A in the tooth T into the keyhole 37, axially pushing the rotation-locking shaft 50 further into the second section 28 against the bias of the spring 39. This completely disengages the rotation-locking collar 54 from the rotation-locking stub 46. Now the rotator section is free to rotate between locked and unlocked positions relative to the pin housing 20 while the key 60 remains inserted. In the locked position, the cam knob 34 is misaligned with the groove G, so that the tooth T cannot be removed from the base B. Once the rotated position of the rotator section 32 has been set, the key 60 is removed, and the rotation-locking collar 54 is biased back into mating engagement with the rotation-locking stub 46. Thus, the rotator section 32 rotates independently of the rotation-locking shaft 50 during functional operation.

Figure 5:
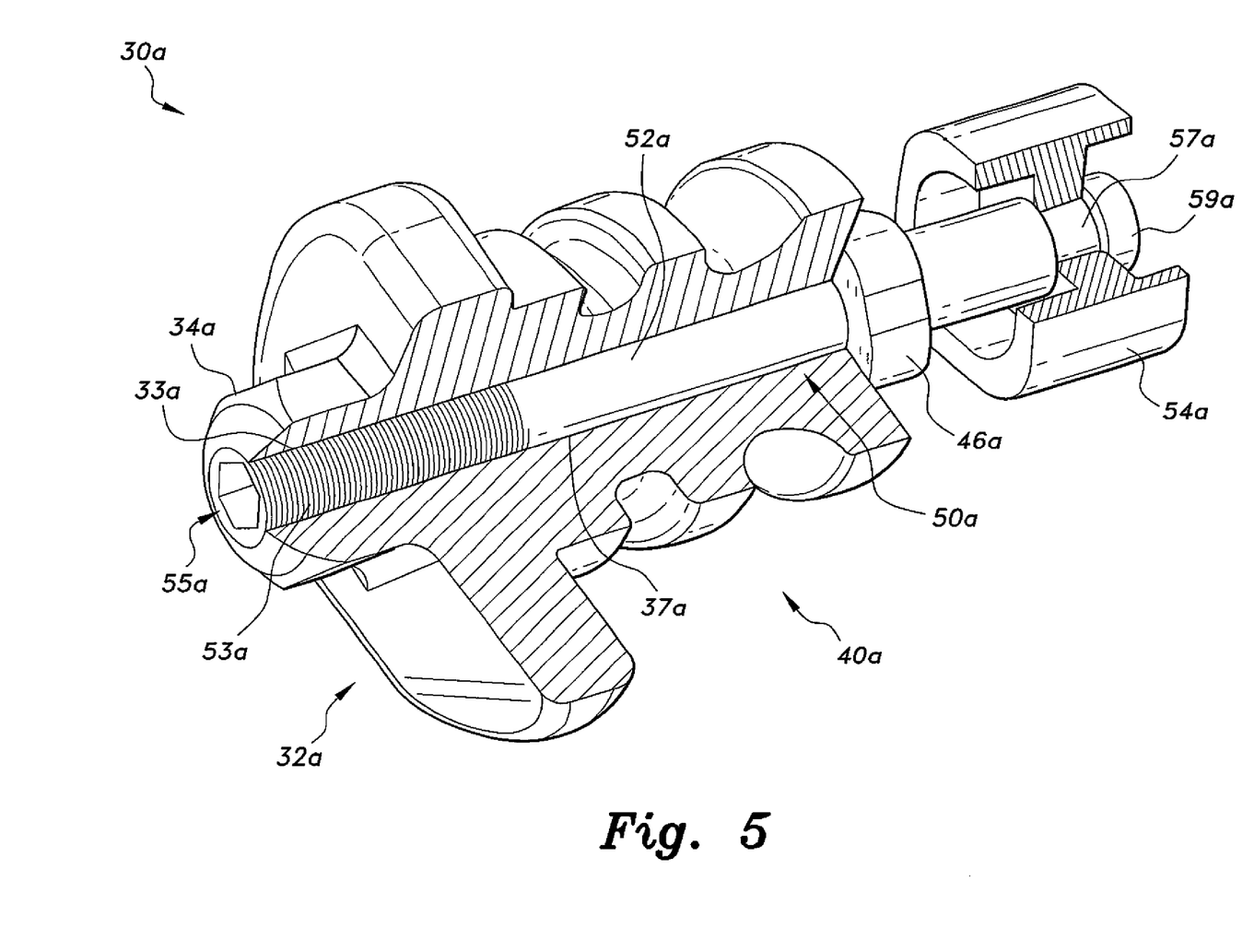
FIG. 5 is a perspective view of a second embodiment of a pin mechanism for the locking pin assembly of FIG. 2, broken away and partially in section.

An alternative pin mechanism 30a is shown in FIG. 5. In this embodiment, selective engagement between the rotation-locking collar and the rotation-locking stub is facilitated by a threaded connection between the rotator section and the rotation-locking shaft. As shown, the alternative pin mechanism 30a includes a rotator section 32a, an integral shaft section 40a and a projecting rotation-locking stub 46a. The shape and form of the above is substantially the same as that of the pin mechanism 30. A rotation-locking shaft 50a includes an elongate post 52a insertably mounted through a keyhole or key-bore 37a and a rotation-locking collar 54a disposed at one end of the post 52a. Again, the above is of similar construction to the previously described pin mechanism 30. However, the post 52a is positively retained inside the key-bore 37a via threaded connection between internal threads 33a in the bore 37a in the rotator section 32a and external threads 53a at the other end of the post 52a. Moreover, the rotation-locking collar 54a is freely rotatable at the one end of the post 52a. The rotation-locking collar 54a is rotatably mounted to a reduced diameter section 57a and retained thereon by an endcap or washer 59a. The exposed end of the post 52a includes a tool recess 55a shaped to receive a corresponding tool or key (not shown). In this exemplary embodiment, the tool recess 55a is shaped as a hex-shaped recess adapted for receiving an Allen key or hex key.

In operation, the rotation-locking shaft 50a is normally connected so that the rotation-locking collar 54a is engaged with the rotation-locking stub 46a. The threaded end of the post 52a preferably projects past the opening of the key-bore 37a on the rotator section 32a. The rotation-locking collar 54a is confined to reciprocate within the second section 28 in the same manner as pin mechanism 30. To disengage the rotation-locking collar 54a from the rotation-locking stub 46a, the user utilizes a key or tool with a shaped head corresponding to the shape of the tool recess 55a, such as a hex-head key, screwdriver or wrench, to turn the post 52a in one direction. This causes the post 52a to slide along the key-bore 37a pushing the rotation-locking collar 54a away from engagement with the rotation-locking stub 46a. When the user has turned the post 52a till the exposed end thereof is at or flush with the top surface of the turning boss 36a, this indicates to the user that the rotation-locking collar 54a is fully disengaged. Thus, the projection extent of the threaded end of post 52a serves as a visual indicator or guide for proper engagement and disengagement. Now the rotator section 32a is free to rotate with respect to the rotation-locking collar 54a between locked and unlocked positions. Once the rotated position of the rotator section 32a has been set so that the cam knob is misaligned with the groove G (for locking the tooth onto the base B) or aligned with the groove G (for removing the tooth from the base B), the user turns the post 52a in the opposite direction with the tool or key until the rotation-locking collar 54a is fully engaged with the rotation-locking stub 46a. The above can be facilitated with or without the spring 39 being disposed in the second section 28 of the bore 22 in the pin housing 20.

Figure 6:
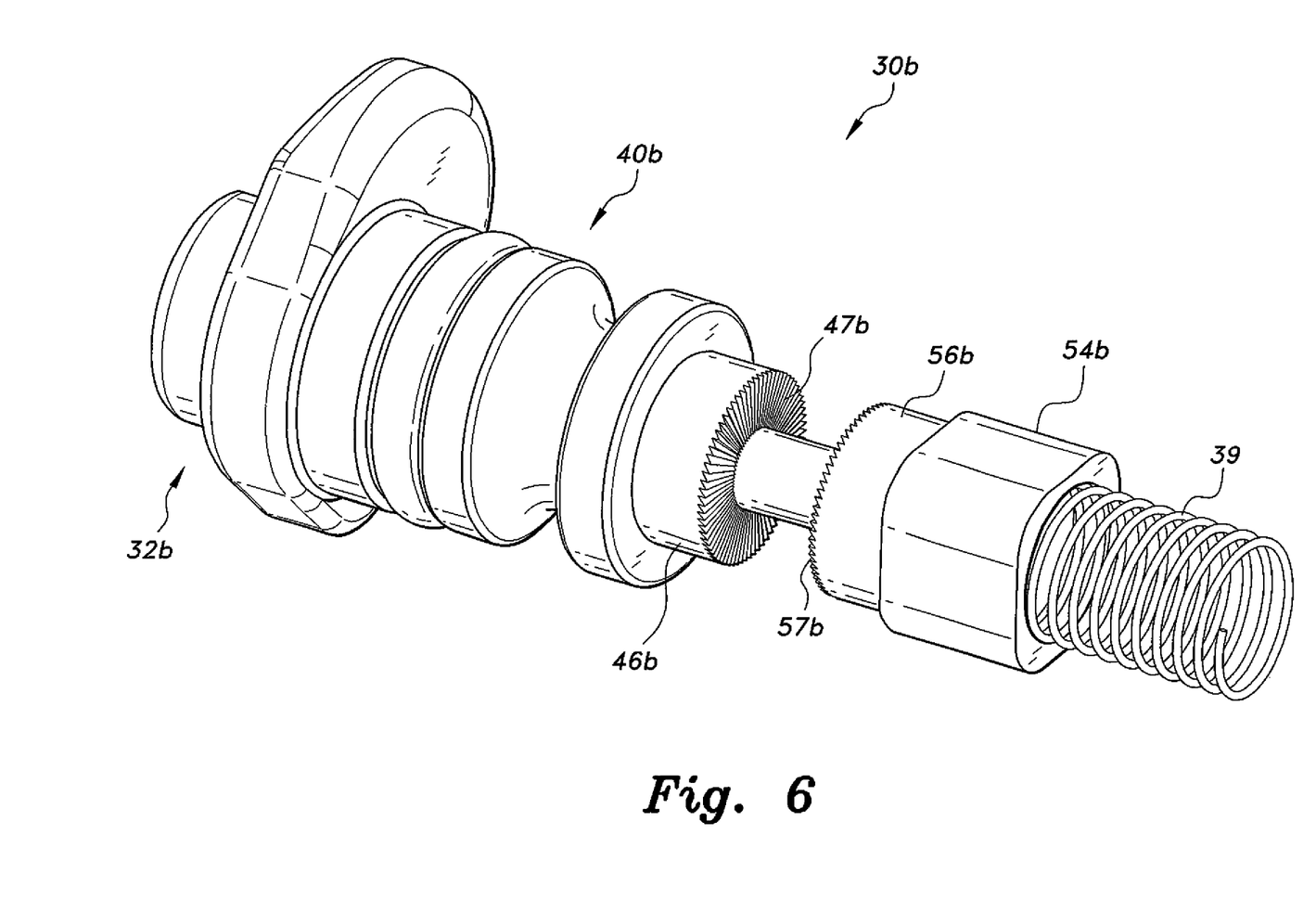
FIG. 6 is a perspective view of a third embodiment of a pin mechanism for the locking pin assembly of FIG. 2.

A further alternative pin mechanism 30b is shown in FIG. 6. In this embodiment, the pin mechanism 30b is configured to compensate for large tolerances in lock and unlock angles. The pin mechanism 30b is constructed similar to the previously described pin mechanism 30 described above, and the following will focus on the alternative configuration.

As shown, the pin mechanism 30b includes a rotator section 32b, an integral shaft section 40b and a first locking member 46b fixed to the bottom of the shaft section 40b. Instead of a recess, a second locking member 56b is integrally fixed to the rotation-locking collar 54b. In this exemplary embodiment, the first and second locking members 46b, 56b are preferably matching, splined clutch joints having respective mating teeth 47b, 57b.

In operation, the first and second locking members 46b, 56b are normally engaged to each other via the mating teeth 47b, 57b. In order to disengage the second locking member 56b from the first locking member 46b, a key, such as the previously described key 60, is used to axially push the rotation-locking shaft 50b further into the second section 28 against the bias of the spring 39. This completely disengages the second locking member 56b from the first locking member 46b. Now the rotator section 32b is free to rotate between locked and unlocked positions relative to the pin housing 20 while the key 60 remains inserted. Due to the abovementioned large tolerances, the rotated angle can be finely adjusted so that the proper locked or unlocked position can be set. Once the rotated position of the rotator section 32b has been set, the key 60 is removed, and the second locking member 56b is biased back into mating engagement with the first locking member 46b. This construction permits minor angular adjustments to be made as needed to compensate for the large tolerances.

Figure 7:
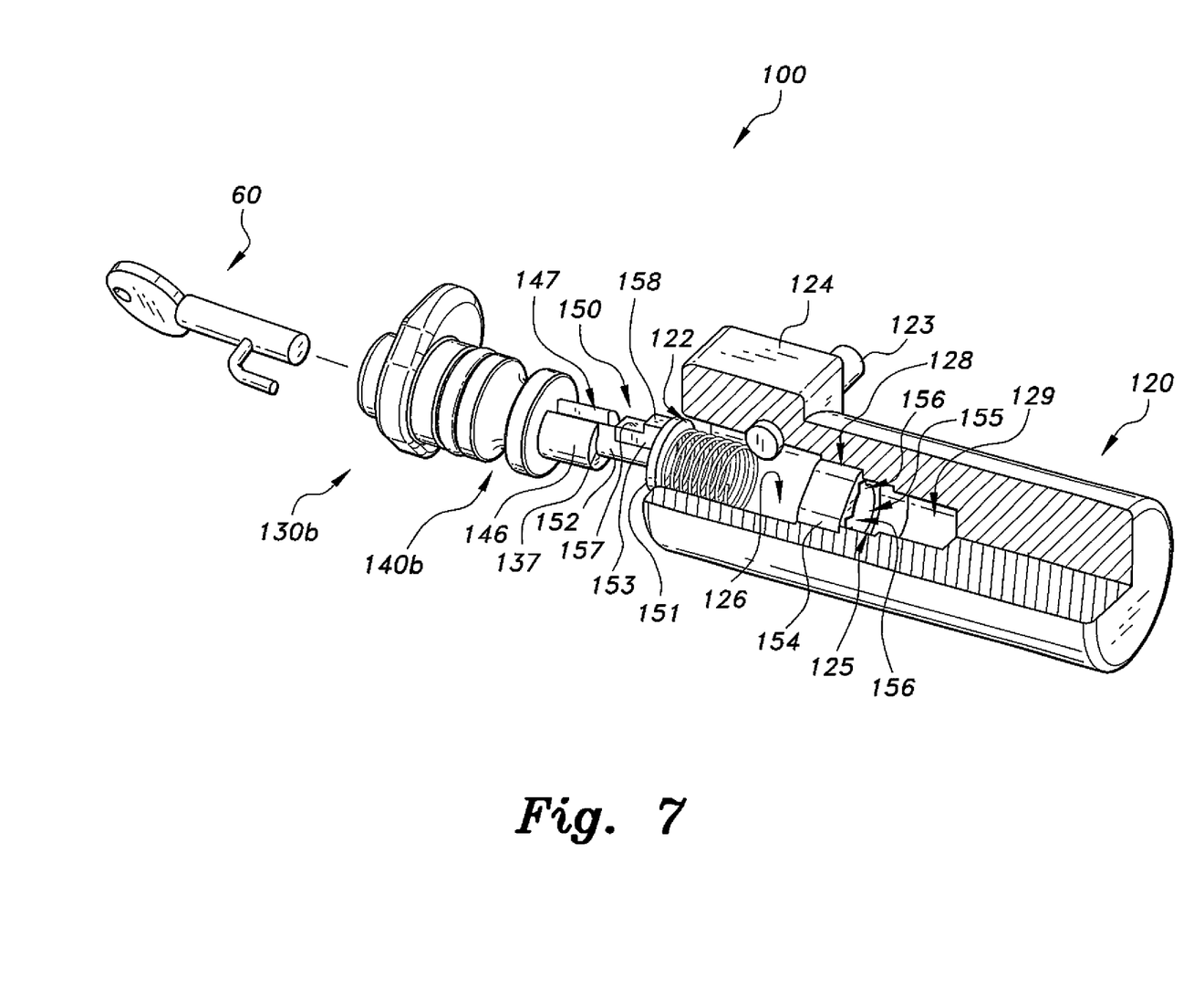
FIG. 7 is a perspective view of a fourth embodiment of a pin mechanism for the locking pin assembly of FIG. 2, broken away and partially in section.

Another alternative locking pin assembly 100 is shown in FIG. 7. In this embodiment, the construction of the locking pin assembly 100 is substantially the same as previously described with respect to the pin assembly 10, except for the manner in which the angular positions of the rotator section is set.

As shown, the locking pin assembly 100 is an alternative single-side access locking pin assembly. The locking pin assembly 100 includes a pin housing 120 (also referred to as a pin body or cartridge) and a pin mechanism or component 130 selectively inserted into the pin housing 120. The pin housing 120 is an elongate, substantially hollow cylindrical housing having a partially squared section 124 attached at one end. The pin housing 120 is configured for insertion into a correspondingly shaped bore PH formed in the tooth base 13. The pin housing 120 includes a substantially circular bore 122 extending about midway through the length of the pin housing 120. The bore 122 accommodates selective insertion of the pin mechanism 130, and the bore 122 is preferably centered on the cylindrical portion of the end having the partially squared section 124.

Unlike the previously described bore 22, the bore 122 is a stepped bore divided into various sections; a first section 126, a second section 128, a third section 125 and a fourth section 129. The first section 126 is an elongate circular bore with a given diameter for receiving the shaft section 140 of the pin mechanism 130. The second section 28 is an elongate non-circular bore of reduced dimensions in coaxial communication with the first section 126. The second section 128 is substantially square in cross section, which accommodates a correspondingly shaped rotation-locking collar 154. The locking collar 154 includes a shaped opening or bore 155 the details of which will be further described below. This rotation locking collar 154 can be molded or fixed onto the second section 128 via adhesives, fasteners or welds. It is to be noted that the second section 128 can be constructed with any other geometric shape so long as the shape can accommodate the shape of the rotation-locking collar 154 and related functions. The third section 125 is an elongate cylindrical bore continuous with the second section 128. The third section 125 includes a diameter smaller than the diameter of the first section 126, and the length of the third section diameter is about the same as the length between opposite sides of the second section 128. The third section 125 accommodates sliding reciprocal movement of the pin mechanism 150. The fourth section 129 is an elongate cylindrical bore continuous with the third section 125 terminating at a closed end of the bore 122. The fourth section 129 is preferably smaller in diameter compared to the diameter of the third section 125. The fourth section 129 accommodates and houses a compression spring 139.

The pin mechanism 130 is of similar construction as the previously described pin mechanism 30 and includes a rotator section 132 and the shaft section 140 with a keyhole or keybore 137 extending all the way through both sections. The shaft section 140 also includes a rotation-locking stub or boss 146 integral and fixed to the bottom of the shaft section 140. The locking boss 146 facilitates selective rotation of a rotation-locking shaft 150, which will be further discussed below. In this exemplary embodiment, the rotation-locking boss 146 is constructed as a C-shaped cylinder with a longitudinal slot 147.

In order to facilitate locking or fixing the pin mechanism 130 at locked and unlocked rotated positions, the pin mechanism 130 includes a rotation-locking shaft 150 configured to reciprocate within the keyhole 137. The rotation-locking shaft 150 includes an elongate post 152 for slidable mounting inside the keyhole 137 and a circular head 151 capping one end of the post 152. The head 151 provides an abutment for the spring 139 and has a diameter about the same as the diameter of the third section 125. Preferably, the diameter of the head 151 is slightly less in order to insure the head 151 can reciprocate inside the third section 125 without interference.

A key-block 153 is disposed between the head 151 and a portion of the post 152 adjacent the head 151. In this exemplary embodiment, the key-block 153 is constructed as an elongate block having a first step 157 and a higher second step 158. The width of the key-block 153 is configured to permit slidable movement within the longitudinal slot 147 on the rotation-locking boss 146. The height of the first step 157 is preferably the same or less than the height of the longitudinal slot 147 to eliminate any interference during axial movement of the post 152.

As best seen in FIG. 7, the shaped bore 155 in the rotation-locking collar 154 is substantially circular with radial, square-shaped locking slots 156 extending past the diameter of the bore. These locking slots 156 correspond to locked and unlocked positions of the pin mechanism 130. The locking slots 156 selectively receive the second step 158 and prevent rotation of the pin mechanism 130.

The pin mechanism 130 is assembled with the spring 139 disposed in the fourth section 129 of the bore 122. The rotation-locking shaft 150 is placed so that the head 151 abuts the spring 129. The length of the third section 125 permits limited reciprocal movement of the head 151 within the third section 125. The rotation-locking collar 154 slides over the post 152 and fixed within the second section 128. Due to the smaller dimensions of the bore 155 in the rotation-locking collar 154, the head 151 is trapped inside the third section 125. The post 152 slides into the keyhole 137, and the shaft section 140 is locked inside the first section 126 by the locking dowel 123.

In operation, the second step 158 is retained in one of the locking slots 156 due to the biased connection of the head 151 with the spring 139. In order to release the locked engagement, the user inserts a key 60 into the opening of the keyhole 137 from the side of the rotator section 132. This axially pushes post 152, which, in turn, causes the second step 158 to slide out of engagement with the locking slot 156. At this point, the length of the key-block 153 insures that the first step 157 is still engaged with the longitudinal slot 147. The pin mechanism 130 is now free to be rotated into the other locked or unlocked position. The user turns the rotator section 132 as desired with the key 60 inserted. Once the rotated position of the rotator section 132 has been set, the key 60 is removed, and the second step 158 is biased back into mating engagement with the other of the locking slots 156. In contrast with the locking pin assembly 10, rotation of the rotator section 132 simultaneously rotates the pin mechanism 150 during functional operation.

Figure 8:
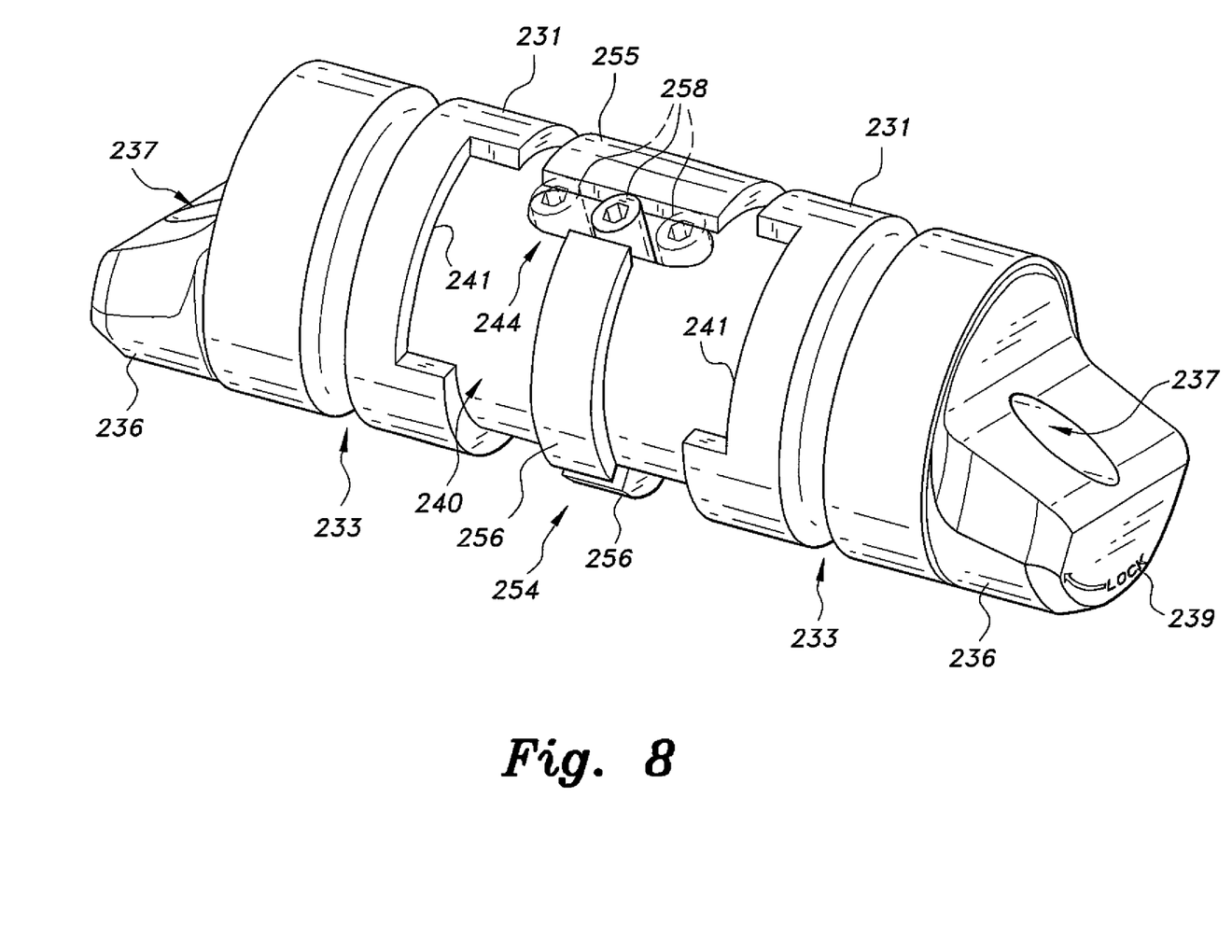
FIG. 8 is a perspective view of an alternative embodiment of a locking pin assembly according to the present invention.
Figure 9:
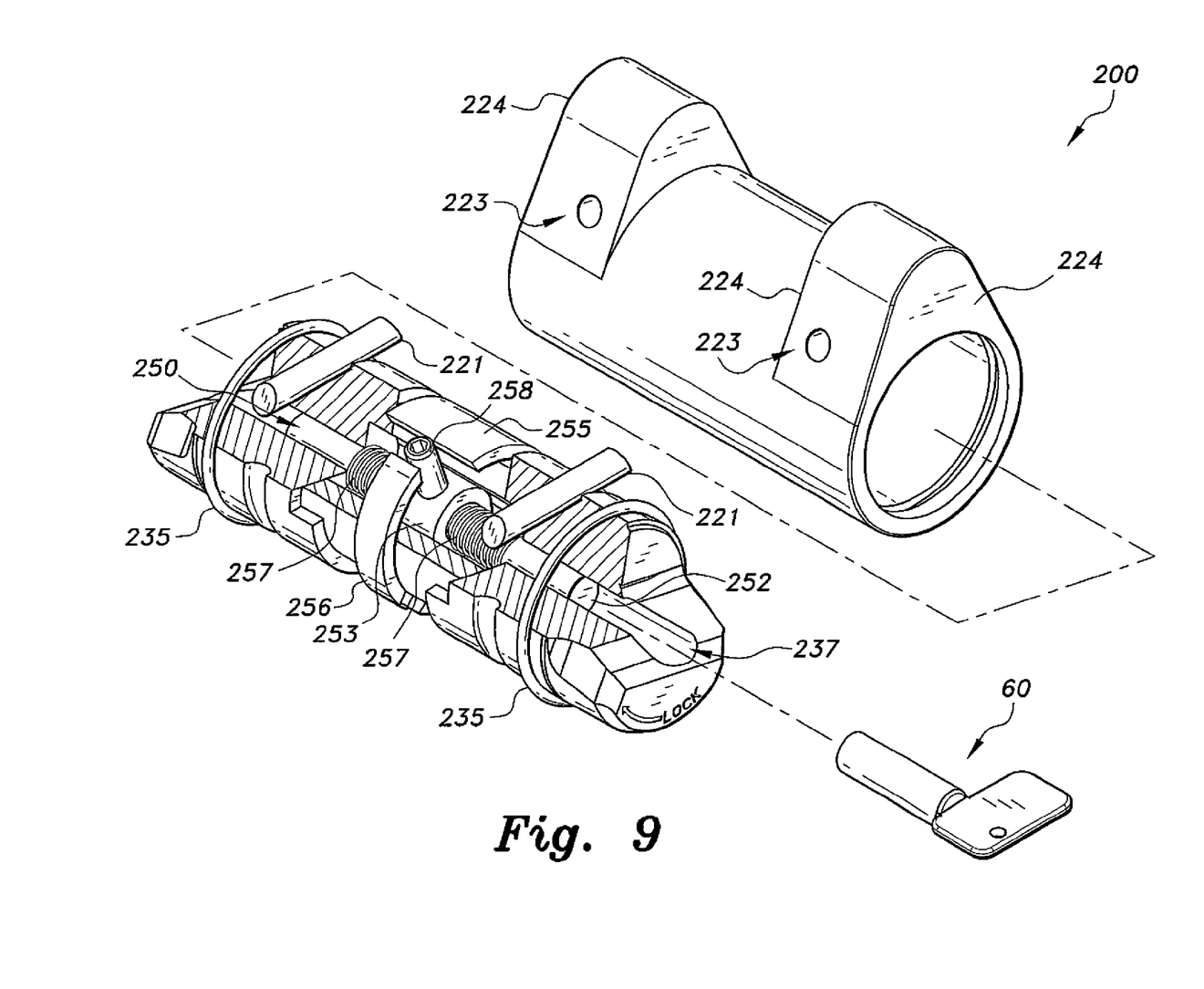
FIG. 9 is an exploded view of the locking pin assembly of FIG. 8.

A still further alternative locking pin assembly 200 is shown in FIGS. 8 and 9. This embodiment is an example of a dual-side access locking pin assembly, and much like the pin assembly taught by Robinson et al., operation of the locking pin assembly 200 can be done from either side.

As shown, locking pin assembly 200 includes a pin housing 220 configured for selective mounting inside the base B and a pin mechanism 230 selectively inserted into the pin housing 220 through a bore 222 extending the length of the pin housing 220. In this embodiment, the pin housing 220 is an elongate, hollow cylinder having teardrop-shaped ends 224, which function similar to the partially squared section 24 in the previously described locking pin assembly 10. The above disposition of the teardrop-shaped ends 224 also substantially reduces weight and material costs compared the conventional pin housing, since the shape does not extend the whole length of the pin housing 20.

A rotation-locking collar 254 is provided about midway inside the bore 222. The rotation-locking collar 254 is preferably constructed from three arcuate segments 255, 256 molded, fastened or welded to the interior of the bore 222. The arcuate segments 255, 256 form a discontinuous annular ring. The space between the segments 255, 256 defines a passage slot for rotation-locking pins or blocks, further described below. One of the arcuate segments 255 has a substantially wider dimension than the remaining arcuate segments 256.

The pin mechanism 230 includes a first rotator section 232 and a second rotator section 234 interconnected by a center section 240. Each rotator section 232, 234 is identical, and when assembled, either rotator section 232, 234 can be accessed from opposite ends of the pin housing 220. Each rotator section 232, 234 is preferably constructed as a relatively short, solid round bar having at least a third of the length forming a wedge section 236, the wedge sections 236 facing opposite directions when assembled. The wedge sections 236 can also be referred to as a cam section because they perform the same function as the previously described cam knob 34. A centrally disposed keyhole or key-bore 238 extends the entire length of the respective rotator section 232, 234. An annular groove 233 is formed about midway along the length of each rotator sections 232, 234. When inserted into the ends of the bore 222, each rotator section 232, 234 is locked in place and prevented from axial movement by a locking dowel 221 inserted into a corresponding locking bore 223 on each teardrop-shaped section 224. The locking dowel 221 rides inside the annular groove 233. Each rotator section 232, 234 can be provided with a resilient O-ring 235 to preventingress of debris into the interior of the pin housing 220. Indicia 239, such as the term "LOCK" and the corresponding directional arrow, can be provided at the distal end face of each wedge section 236 as a visual aid for the user, indicating the proper rotational direction for locking. The indicia 239 can be stamped, painted or etched onto the end face.

The center section 240 is constructed as an elongate tubular body having at least a pair of opposite, arcuate segments, teeth or splines 241 extending from each opposite end of the body. Each rotator section 232, 234 also includes at least a pair of opposite, arcuate segments, teeth or splines 231 extending axially from the end opposite the wedge section 236. The splines 241 on the center section 240 and the splines 231 on each rotator section 232, 234 permit these components to be in interlocking engagement with each other so that rotation of one of the rotator sections 232, 234 insures simultaneous rotation of the center section 240 and the other rotator section 232, 234. The center section 240 is configured to be threaded through the rotation-locking collar 254. Thus, the outer diameter of the center section 240 is preferably slightly smaller than the inner, virtual diameter of the rotation-locking collar 254 to allow for rotational and axial, interference-free engagement between the two. The center section 240 also includes a pair of elongate slots 244 formed thereon. These elongate slots 244 are preferably angularly spaced about 90° or more apart and extend axially along the length of the body.

To facilitate selective rotation of the pin mechanism 230 between locked and unlocked positions, the pin mechanism 230 includes a rotation-locking shaft 250. Each end of the rotation-locking shaft 250 is configured to be inserted through the keyhole 237 of a respective rotator section 232, 234. The rotation-locking shaft 250 includes an elongate post 252 with an integral center collar 253 disposed midway along the length of the post 252. A spring 257 is slidably disposed on the post 252 at each axial end of the center collar 253. These springs 257 insure that the center collar 253 is normally biased midway along the length of the pin mechanism 230 when fully assembled. A pair of radially extending rotation-locking blocks, posts or pins 258 project from the center collar. These rotation-locking blocks 258 are configured to be threaded through the elongate slots 244 and selectively engage the spaces or gaps between the arcuate segments 255, 256 of the rotation-locking collar 254. The elongate slots 244 define the limits of axial movement for the rotation-locking blocks 258.

In operation, the rotation-locking blocks 258 are normally engaged in two of the three gaps in the rotation-locking collar 254. In order to rotate or turn the pin mechanism 230 from one position to another, the user inserts a key, such as the previously described key 60, into the keyhole 237 at one of the rotator sections 232, 234. This axially pushes the post 252 against the bias of one of the springs 257 forcing the rotation-locking blocks 258 to slide out of engagement with the respective gaps. With the key 60 retained in the keyhole 237, the user turns either rotator sections 232, 234 into the desired position and removes the key 60. This releases the post 252 so that the center collar 253 can return to the normal, centered position except that the rotation-locking blocks 258 will slide into another pair of gaps in the rotation-locking collar 254. In either rotated locked or unlocked positions, the rotation-locking blocks 258 are prevented from further rotation because of the adjacent arcuate segments defining the gaps form an obstruction to such movement. Moreover, in this exemplary embodiment, one of the gaps, e.g., the middle gap between the thin arcuate segments 256, will always be engaged by one of the rotation-locking blocks 258 in both positions while one of the remaining gaps will alternately be unoccupied. The wider width of the arcuate segment 255 also functions as an abutment that defines the extent of arcuate movement for the rotation-locking blocks 258, i.e., the rotation-locking blocks 258 can only rotate between open ends of the arcuate segment 255.

Figure 10:
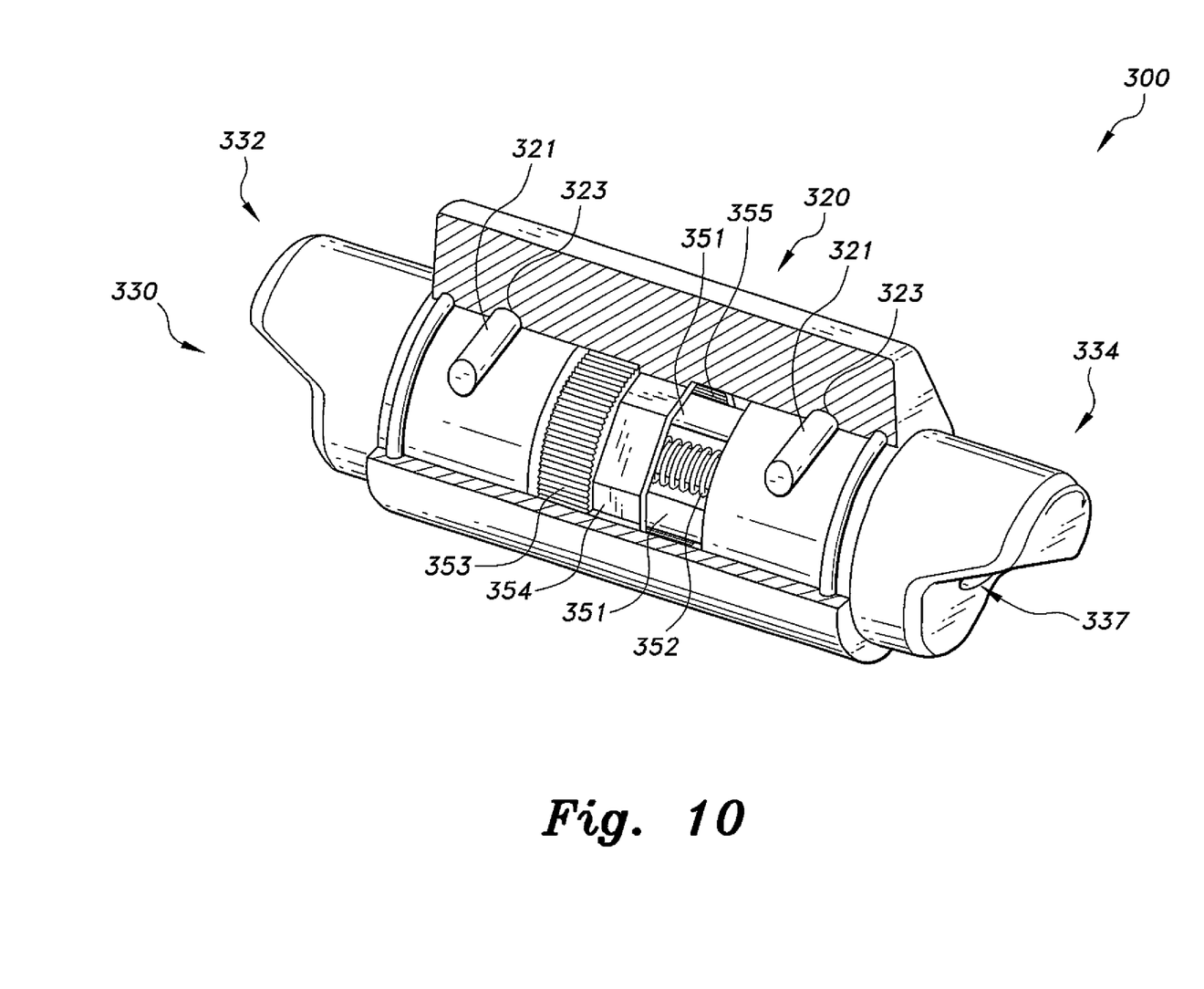
FIG. 10 is a perspective view of a further alternative locking pin assembly according to the present invention, broken away and partially in section.
Figure 11:
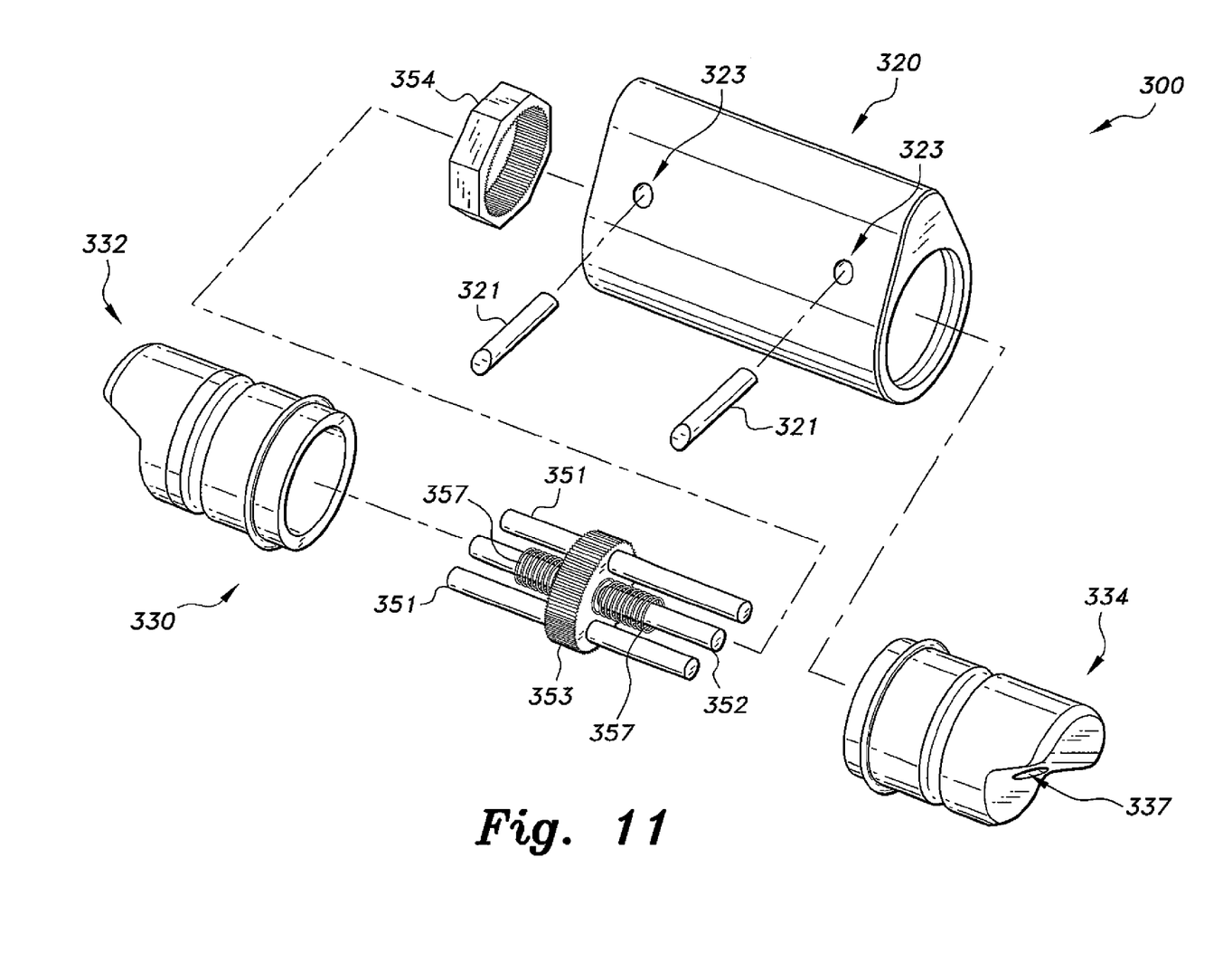
FIG. 11 is an exploded view of the locking pin assembly of FIG. 10.

Another embodiment of a locking pin assembly 300 is shown in FIGS. 10 and 11. This embodiment is another example of a dual-side access locking pin assembly, and the construction thereof is much the same as the abovementioned locking pin assembly 200, except for the features for locking rotated positions.

As shown, the locking pin assembly 300 includes a pin housing 320 configured for selective mounting inside the base 13 and a pin mechanism 330 selectively inserted into the pin housing 320 through a bore 322 extending the length of the pin housing 320. In this exemplary embodiment, the pin housing 320 is an elongate, hollow cylinder having a teardrop-shaped in cross section. It is to be understood that the pin housing 320 can also be constructed similarly as that of the previously described pin housing 220 for weight reduction purposes.

A rotation-locking collar 354 is provided about midway inside the bore 322. The rotation-locking collar 354 is preferably constructed as a polygonal nut, i.e., for preventing rotation of the rotation-locking collar 354 within the pin housing 322, with a bore having inner gear teeth or splines 355. The bore is configured to receive a center gear collar, to be described.

To facilitate selective rotation of the pin mechanism 330 between locked and unlocked positions, the pin mechanism 330 includes a rotation-locking shaft 350. Each end of the rotation-locking shaft 350 is configured to be inserted through the keyhole 337 of a respective rotator section 332, 334. The rotation-locking shaft 350 includes an elongate post 352 having an integral center gear collar 353 disposed midway along the length of the post 352. A spring 357 is slidably disposed on the post 352 at each axial end of the center gear collar 353. These springs 357 insure that the center gear collar 353 is normally biased midway along the length of the pin mechanism 330 when fully assembled. The center gear collar 353 selectively engages the inner teeth or splines 355 on the rotation-locking collar 354. Unlike the locking pin assembly 200, the rotation-locking shaft 350 also includes at least a pair of parallel spaced, elongate dowels 351 slidably mounted through the center gear collar 353 to respective rotator sections 332, 334. The dowels 351 interconnect the rotator sections 332, 334 with the rotation-locking shaft 350 to insure they all rotate concurrently. The dowels 351 also provide structural stability comparable to a solid shaft but with much less material.

The operation of the locking pin assembly 300 is substantially similar to the locking pin assembly 200. In operation, a key 60 is used to push the post 352 to cause the center gear collar 353 to disengage the rotation-locking collar 354. The user rotates one of the rotator sections 332, 334 into the desired locking or unlocking positions and removes the key so re-engagement can be established. In this embodiment, finer angular adjustments can be made to compensate for large tolerances. As an alternative, the post 352 can be disposed offset from the central axis of the pin mechanism 330, and the center gear collar 353 can be provided as a smaller gear with gear teeth segments that selectively engage portions of the inner teeth 355. This arrangement would require an offset disposition for the keyhole 337.

Thus, it can be seen that all the locking pin assemblies are relatively lightweight yet durable low-torque or low-effort solution for tool-less locking and unlocking of replaceable excavation teeth and other mating parts. The components are relatively easy to manufacture, and the operational features are relatively easy to operate with minimal safety issues.

It is to be understood that the present invention is not limited to the embodiments described above, but encompasses any and all embodiments within the scope of the following claims.

I claim:

1. A locking pin assembly, comprising:
   an elongate pin housing having a blind bore extending from one end of the housing to about midway along the length thereof;
   a pin mechanism having a portion inserted into and selectively rotatable in the blind bore of the pin housing, the pin mechanism having:
      at least one rotator section having a cam knob rotatable between an unlocked position adapted for sliding through a groove in an excavator tooth and a locked position adapted for locking the tooth on a base, the cam knob being aligned with the groove in the unlocked position and misaligned with the groove in the locked position, the cam knob remaining outside the -bore;
      a shaft section integral with the rotator section, the shaft section and the rotator section having a keyhole extending therethrough;
      an elongate post slidably disposed in the keyhole and extending into the blind bore;
      a rotation-locking mechanism disposed between the at least one rotator section and the elongate post; the rotation-locking mechanism being selectively engageable between locked and unlocked positions;
      a spring disposed behind the rotation-locking collar in the blind bore of the pin housing; and
   a key selectively insertable into the keyhole, the key selectively pushing the elongate post against the bias of the spring in order to selectively disengage the rotation-locking mechanism for subsequent rotation of the rotator section between locked and unlocked positions.

2. The locking pin assembly according to claim 1, wherein said rotation locking mechanism comprises a non-circular rotation-locking member projecting from the bottom of the shaft section and a non-circular rotation-locking collar disposed at one end of said post, the rotation-locking collar having a non-circular recess thereon for selectively receiving the rotation-locking member.

3. The locking pin assembly according to claim 2, wherein said pin housing comprises an elongate, substantially hollow cylinder having a partially squared section at one end, said pin housing being adapted for selective insertion into a correspondingly shaped bore in the base, thereby preventing rotation of the pin housing with respect to the base during use, the partially squared section having a locking dowel extending perpendicular to the length of said pin housing and through said blind bore.

4. The locking pin assembly according to claim 3, wherein the blind bore comprises a stepped bore having a first section and a second section continuous with the first section, the first section having an elongate circular bore with a given diameter configured to slidably receive said shaft section, the second section having an elongate non-circular bore extending to the end of the blind bore, the second section being of reduced dimensions from the given diameter, the second section housing said spring and selectively receiving said non-circular rotation-locking collar.

5. The locking pin assembly according to claim 3, wherein the blind bore comprises a stepped bore having a first section, a second section, a third section and a fourth section all in continuous, axial communication with each other; the first section having an elongate circular bore with a given diameter configured to slidably receive said shaft section; the second section having an elongate non-circular bore with reduced dimensions than the first section; the third section having an elongate circular bore with a diameter smaller than the first section; and the fourth section having an elongate circular bore terminating at the closed end of said blind bore, the fourth section having a diameter smaller than the third section.

6. The locking pin assembly according to claim 2, wherein said shaft section comprises a substantially cylindrical body having at least one annular groove formed around the cylindrical body.

7. The locking pin assembly according to claim 6, wherein said at least one annular groove comprises a first annular groove for receiving an O-ring to seal said shaft section within said pin housing and a second annular groove spaced from said first annular grove, the second annular groove receiving said locking dowel in said squared section in order to prevent axial movement of said shaft section while maintaining rotational movement thereof.

8. The locking pin assembly according to claim 2, wherein said elongate post comprises a threaded end engaged with said at least one rotator section, the post having an opposite end having a reduced diameter section where said rotation-locking collar is mounted freely rotatable thereon, the post having an endcap at the opposite end for retaining the rotation-locking collar, selective threading or unthreading of said elongate post sliding said elongate post and said rotation-locking collar between engagement and disengagement with said rotation-locking member.

9. The locking pin assembly according to claim 1, wherein said cam knob comprises a projecting turning boss coaxial with said keyhole.

10. The locking pin assembly according to claim 9, wherein said key comprises a head for manual manipulation, an elongate key shaft extending from the head, and a key guide extending from a lower portion of the key shaft.

11. The locking pin assembly according to claim 10, wherein said key guide comprises a substantially L-shaped bracket selectively straddling said turning boss to a predetermined depth when said key is inserted into the keyhole through said turning boss.

12. The locking pin assembly according to claim 1, wherein said rotation locking mechanism comprises a splined clutch joint and a non-circular rotation-locking collar disposed at one end of said post, the splined clutch joint having a first locking member integral with said shaft section and projecting from the bottom thereof and a second locking member integral with said non-circular rotation-locking collar, the first and second locking members having matching teeth for selective engagement with each other at select relative rotated positions therebetween.

13. The locking pin assembly according to claim 12, wherein said rotation locking mechanism comprises:
   a rotation-locking boss projecting from the bottom of said shaft section and integral therewith, the rotation-locking boss having an elongate slot thereon;
   a circular head disposed at one end of said elongate post capping the one end, said spring being received within said fourth section, the circular head being reciprocable within said third section with and against the bias of said spring;
   a key-block disposed between the circular head and a portion of said elongate post adjacent the head, the key block having integral first step and second step, one of the first and second steps having a height greater than the other, the key-block being reciprocable within the elongate slot; and
   a rotation-locking collar disposed within said second section, the rotation-locking collar having a shaped bore and at least two locking slots radiating therefrom, one of the locking slots corresponding to a locked position of the key-block and the other of the locking slots corresponding to an unlocked position of the key-block, the key-block being selectively insertable into one of the locking slots upon reciprocation of said elongate post, said spring normally biasing the key-block into engagement with one of the locking slots;

wherein selective pushing of said elongate post against the bias of said spring disengages the key-block from one of the locking slots to free the key-block for rotation between locked and unlocked positions and upon reaching the desired rotated position, release of pushing force facilitates insertion of the key-block into the other of the locking slots.

14. A locking pin assembly, comprising:
an elongate pin housing having a through-bore extending from one end of the housing to the other end;
a pin mechanism inserted into and selectively rotatable in the through-bore of the pin housing, the pin mechanism having;
    a pair of rotator sections, each of the rotator sections having a cam section rotatable between an unlocked position adapted for sliding through a groove in an excavator tooth and a locked position adapted for locking the tooth on a base, the cam section being aligned with the groove in the unlocked position and misaligned with the groove in the locked position, the cam section remaining outside the through-bore, each of the rotator sections having an elongate keyhole;
    an elongate center section disposed between the pair of rotator sections in interlocking engagement therewith, the center section having a bore and at least one elongate slot formed on a wall of the center section, the bore of the center section in axial communication with the keyholes of the rotator sections;
    an elongate post slidably disposed in the bore of the center section and extending into the keyholes at opposite ends of the center section, the elongate post having at least one locking block extending radially through at least one elongate slot of the center section;
    a rotation-locking collar affixed to the interior wall in the through-bore of the pin housing about midway thereof, the rotation-locking collar having passageways defining movement for the locking block between locked and unlocked positions; and
    at least one spring disposed along the elongate post biasing the at least one locking block to a centered position in the elongate slot, portions of the passageways in the rotation-locking collar defining the locked and unlocked positions preventing relative rotation of the locking block when the locking block is centered by the at least one spring and engaged in the passageway portion; and
a key selectively insertable into one of the keyholes, the key selectively pushing the elongate post against the bias of the at least one spring in order to selectively disengage the locking block for subsequent rotation of a selected rotator section between locked and unlocked positions.

15. The locking pin assembly according to claim 14, wherein said pin housing comprises an elongate, substantially hollow cylinder having a teardrop-shaped section at opposite ends, said pin housing being adapted for selective insertion into a correspondingly shaped bore in the base, thereby preventing rotation of the pin housing with respect to the base during use, each teardrop-shaped section having a locking dowel extending perpendicular to the length of said pin housing and through said through-bore, each said rotator section having a first annular groove for receiving an O-ring to seal said rotator section within said pin housing and a second annular groove spaced from said first annular grove, the second annular groove receiving a respective locking dowel in the teardrop-shaped section in order to prevent axial movement of the respective rotator section while maintaining rotational movement thereof.

16. The locking pin assembly according to claim 14, wherein said elongate post further comprises a center collar centrally disposed along the length of said elongate post, said at least one locking block radially extending from the center collar, the at least one spring being a pair of springs, the springs being disposed on opposite ends of the center collar, respectively.

17. The locking pin assembly according to claim 14, wherein said rotation-locking collar comprises a plurality of arcuate segments forming a discontinuous annular ring, one of the arcuate segments having a width wider than the other arcuate segments, the discontinuities and width differences defining said passageways for movement of said locking block and the wider arcuate segment forming an abutment defining the limits of relative rotation for said locking block between locked and unlocked positions.

18. A locking pin assembly, comprising:
an elongate pin housing having a through-bore extending from one end of the housing to the other end;
a pin mechanism inserted into and selectively rotatable in the through-bore of the pin housing, the pin mechanism having;
    a pair of rotator sections, each of the rotator sections having a cam section rotatable between an unlocked position adapted for sliding through a groove in an excavator tooth and a locked position adapted for locking the tooth on a base, the cam section being aligned with the groove in the unlocked position and misaligned with the groove in the locked position, the cam section remaining outside the through-bore, each of the rotator sections having an elongate keyhole;
    an elongate post slidably disposed between the rotator sections, the post having opposite ends extending into the opposing keyholes;
    a rotation-locking mechanism disposed between the rotator sections, the rotation-locking mechanism permitting user-defined, incremental rotated positions of the rotator sections in order to adjustably lock into the locked and unlocked positions; and
    at least one spring disposed along the elongate post; and
a key selectively insertable into one of the keyholes, the key selectively pushing the elongate post against the bias of the at least one spring in order to selectively disengage the rotation-locking mechanism for subsequent rotation of a selected rotator section between locked and unlocked positions.

19. The locking pin assembly according to claim 18, wherein said pin housing comprises:
    an elongate, substantially hollow cylinder having a teardrop-shaped cross section, said pin housing being adapted for selective insertion into a correspondingly shaped bore in the base, thereby preventing rotation of the pin housing with respect to the base during use; and
    a locking dowel extending perpendicular to the length of said pin housing and through said through-bore near each end of said pin housing, each said rotator section having a first annular groove for receiving an O-ring to seal said rotator section within said pin housing and a second annular groove spaced from said first annular grove, the second annular groove receiving a respective locking dowel in the teardrop-shaped section in order to prevent axial movement of the respective rotator section while maintaining rotational movement thereof.

20. The locking pin assembly according to claim 18, wherein said rotation-locking mechanism comprises:
   a rotation-locking collar affixed to the interior wall in the through-bore of the pin housing about midway thereof, the rotation-locking collar having a plurality of inner gear teeth;
   a center gear collar mounted to the elongate post, the center gear collar having a plurality of outer gear teeth, the outer gear teeth selectively being engageable with the inner gear teeth to lock rotated positions of the center gear collar, said at least one spring being a pair of springs, the springs being disposed on opposite sides of the center gear, each said rotator section and the center gear collar having at least one hole offset from the respective engaged position with said elongate post; and
   at least one dowel interconnecting said rotator sections and said center gear collar in order to insure simultaneous rotation thereof;
   wherein selective pushing of said elongate post from one of said rotator sections against the bias of a respective spring disengages the center gear collar from the rotation-locking collar to free the center gear collar for rotation between locked and unlocked positions and upon reaching the desired rotated position, release of pushing force facilitates insertion of the center gear collar back into the rotation-locking collar.

\* \* \* \* \*